（12）United States Patent
Nakagawa

(10) Patent No.: US 11,745,706 B2
(45) Date of Patent: Sep. 5, 2023

(54) VEHICLE MOTION CONTROL DEVICE, VEHICLE MOTION CONTROL METHOD, AND VEHICLE MOTION CONTROL SYSTEM

(71) Applicant: Hitachi Astemo, Ltd., Hitachinaka (JP)

(72) Inventor: Satoshi Nakagawa, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 175 days.

(21) Appl. No.: 17/436,778

(22) PCT Filed: Jan. 30, 2020

(86) PCT No.: PCT/JP2020/003406
§ 371 (c)(1),
(2) Date: Sep. 7, 2021

(87) PCT Pub. No.: WO2020/183963
PCT Pub. Date: Sep. 17, 2020

(65) Prior Publication Data
US 2022/0185249 A1 Jun. 16, 2022

(30) Foreign Application Priority Data
Mar. 8, 2019 (JP) .................. 2019-042656

(51) Int. Cl.
*B60W 60/00* (2020.01)
*B60T 8/1755* (2006.01)
(Continued)

(52) U.S. Cl.
CPC ....... *B60T 8/17552* (2013.01); *B60W 10/188* (2013.01); *B60W 10/20* (2013.01);
(Continued)

(58) Field of Classification Search
CPC ............ B60T 8/17552; B60T 2230/02; B60T 2250/03; B60T 2270/86; B60T 7/12;
(Continued)

(56) References Cited

U.S. PATENT DOCUMENTS 8,825,297 B2 * 9/2014 Tanimoto ............... B62D 6/002
180/443
2005/0125131 A1 * 6/2005 Kato ....................... B60T 8/172
701/70
(Continued)

FOREIGN PATENT DOCUMENTS

DE 102016115339 A1 * 3/2017 ............ B60W 10/20
JP 2007160998 A * 6/2007
(Continued)

OTHER PUBLICATIONS

International Search Report (PCT/ISA/210) issued in PCT Application No. PCT/JP2020/003406 dated Apr. 7, 2020 with English translation (five (5) pages).
(Continued)

*Primary Examiner* — B M M Hannan
(74) *Attorney, Agent, or Firm* — Crowell & Moring LLP

(57) ABSTRACT

In motion control in the present invention, operation amounts relating to braking and drive are set as a control command when a difference between a physical quantity relating to a target vehicle attitude which is based on a target trajectory and a physical quantity relating to a linear model vehicle attitude which is based on a linear model of a vehicle exceeds a threshold value, operation amounts relating to braking and steering are set as the control command when the difference is equal to or smaller than the threshold value, and an attitude of the vehicle in a yaw direction is controlled based on the control command.

13 Claims, 15 Drawing Sheets

(51) Int. Cl.
*B60W 10/188* (2012.01)
*B60W 10/20* (2006.01)
*B60W 30/045* (2012.01)
*B60W 30/12* (2020.01)
*B60W 30/14* (2006.01)
*B60W 40/103* (2012.01)
*B60W 40/109* (2012.01)
*B60W 40/114* (2012.01)

(52) U.S. Cl.
CPC .......... *B60W 30/045* (2013.01); *B60W 30/12* (2013.01); *B60W 30/143* (2013.01); *B60W 40/103* (2013.01); *B60W 40/109* (2013.01); *B60W 40/114* (2013.01); *B60W 60/001* (2020.02); *B60T 2230/02* (2013.01); *B60T 2250/03* (2013.01); *B60W 2520/125* (2013.01); *B60W 2520/14* (2013.01); *B60W 2520/20* (2013.01)

(58) Field of Classification Search
CPC .. B60W 10/188; B60W 10/20; B60W 30/045; B60W 30/12; B60W 30/143; B60W 40/103; B60W 40/109; B60W 40/114; B60W 60/001; B60W 2520/125; B60W 2520/14; B60W 2520/20; B60W 2510/207; B60W 2520/105; B60W 2710/0666; B60W 2710/18; B60W 2710/20; B60W 2710/207; B60W 10/04; B60W 10/18; B62D 6/00
USPC .......................................................... 701/72
See application file for complete search history.

(56) References Cited

U.S. PATENT DOCUMENTS

| | | | |
|---|---|---|---|
| 2009/0287376 A1 | 11/2009 | Aso | |
| 2010/0168998 A1* | 7/2010 | Matsunaga | B60W 30/10 701/532 |
| 2011/0313740 A1* | 12/2011 | Ikeda | G05B 17/02 703/2 |
| 2012/0215406 A1* | 8/2012 | Tanimoto | B62D 15/025 701/41 |
| 2013/0190983 A1* | 7/2013 | Tatsukawa | B62D 15/025 701/41 |
| 2015/0012179 A1* | 1/2015 | Matsuno | B62D 1/28 701/41 |
| 2015/0094915 A1* | 4/2015 | Oyama | B60W 30/12 701/42 |
| 2015/0183460 A1* | 7/2015 | Oyama | B62D 6/00 701/41 |
| 2015/0336607 A1* | 11/2015 | Inoue | B60W 30/10 701/41 |
| 2017/0036692 A1* | 2/2017 | Kojo | B62D 6/06 |
| 2017/0088168 A1* | 3/2017 | Oyama | G05D 1/0234 |
| 2017/0210414 A1* | 7/2017 | Sato | B62D 5/0463 |
| 2018/0086341 A1* | 3/2018 | Taniguchi | B62D 6/008 |
| 2018/0093709 A1* | 4/2018 | Oguro | B60W 30/12 |
| 2018/0190123 A1* | 7/2018 | Oka | G08G 1/167 |
| 2018/0273026 A1* | 9/2018 | Oyama | B60W 30/18145 |
| 2019/0302763 A1* | 10/2019 | Kondo | B60W 30/10 |
| 2020/0180626 A1* | 6/2020 | Mizoguchi | B60W 30/18 |
| 2020/0398838 A1* | 12/2020 | Oguro | B60W 30/16 |
| 2022/0185249 A1* | 6/2022 | Nakagawa | B60W 30/045 |

FOREIGN PATENT DOCUMENTS

| | | | |
|---|---|---|---|
| JP | 2008-143269 A | | 6/2008 |
| JP | 2010-195325 A | | 9/2010 |
| JP | 2014234111 A | * | 12/2014 |
| JP | 2018167734 A | * | 11/2018 |
| JP | 2020142746 A | * | 9/2020 ......... B60T 8/17552 |

OTHER PUBLICATIONS

Japanese-language Written Opinion (PCT/ISA/237) issued in PCT Application No. PCT/JP2020/003406 dated Apr. 7, 2020 with English translation (13 pages).

* cited by examiner

VEHICLE MOTION CONTROL DEVICE, VEHICLE MOTION CONTROL METHOD, AND VEHICLE MOTION CONTROL SYSTEM

TECHNICAL FIELD

The present invention relates to a vehicle motion control device, a vehicle motion control method, and a vehicle motion control system which are configured to control motion of a vehicle in accordance with a travel target including a target trajectory.

BACKGROUND ART

In Patent Literature 1, there is disclosed a vehicle control device configured to calculate, based on a dynamic vehicle model obtained by modeling a motion state of a vehicle traveling in accordance with a travel target, for example, a target trajectory and a speed pattern, an operation amount for changing an operation amount required to operate an actual vehicle and a motion state amount, determine whether or not the calculated operation amount and motion state amount satisfy a predetermined travel requirement for the actual vehicle, and to set the operation amount and motion state amount determined as satisfying the travel requirement as a feedforward operation amount and a target state amount in state feedback control, respectively.

CITATION LIST

Patent Literature

PTL 1: JP 2008-143269 A

SUMMARY OF INVENTION

Technical Problem

When, as in Patent Literature 1, whether or not a calculated operation amount and motion state amount satisfy a predetermined travel requirement for an actual vehicle is determined, an ability to follow a travel target may deteriorate due to insufficient determination accuracy or a response delay caused by, for example, a period of time taken to find a solution when it is determined that the travel requirement is not satisfied or a period of time taken to understand that there is no solution.

Solution to Problem

An object of the present invention is to provide a vehicle motion control device, a vehicle motion control method, and a vehicle motion control system which are capable of improving an ability of an actual vehicle to follow a travel target.

According to one embodiment of the present invention, a first control amount being an operation amount required for operation of a vehicle is determined based on a vehicle motion model obtained by modeling a motion state of the vehicle for travel in accordance with a travel target including a target trajectory, a second control amount being an operation amount of the vehicle is determined based on the first control amount and an actual motion state input from a vehicle motion state detection sensor configured to detect the actual motion state of the vehicle, and a control command of operation amounts relating to braking, drive, and steering of the vehicle is determined based on the second control amount, a physical quantity relating to a target vehicle attitude which is based on the target trajectory, and a physical quantity relating to a linear model vehicle attitude which is based on a linear model of the vehicle.

According to one embodiment of the present invention, it is possible to improve the ability of the actual vehicle to follow the travel target.

DESCRIPTION OF EMBODIMENTS

A vehicle motion control device, a vehicle motion control method, and a vehicle motion control system according to embodiments of the present invention are now described with reference to the drawings.

Figure 1:
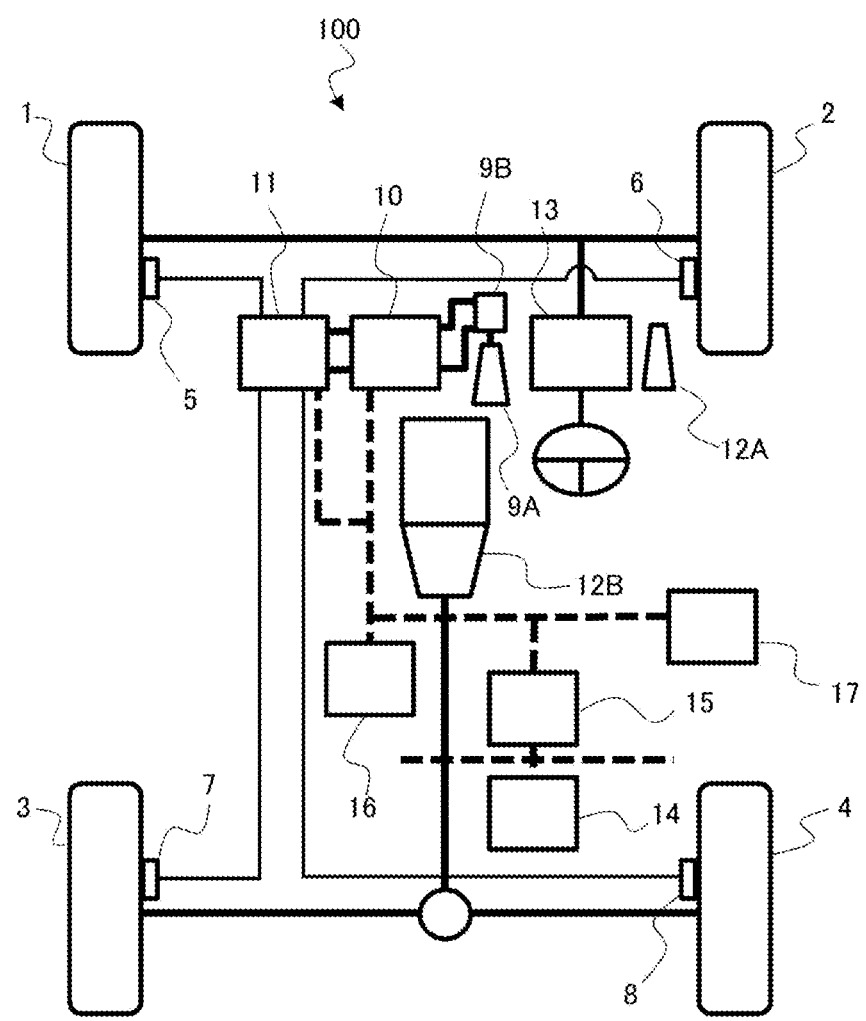
FIG. 1 is a block diagram of a vehicle control system.

FIG. 1 is a block diagram for illustrating one aspect of the vehicle motion control system.

A vehicle 100 is a four-wheeled vehicle including a left front wheel 1, a right front wheel 2, a left rear wheel 3, and a right rear wheel 4. The wheels 1 to 4 include wheel cylinders 5 to 8 forming a hydraulic braking device, respectively.

A brake operation member 9A represented by a brake pedal is configured to transmit a braking operation force of a driver of the vehicle 100 to a master cylinder 9B, and the master cylinder 9B is configured to convert the braking operation force of the driver into hydraulic pressure.

A braking force generation device 10 is a device configured to supply hydraulic pressure to each wheel cylinder 5 to 8, and which is capable of adjusting the braking force applied to each of the wheels 1 to 4.

A wheel cylinder hydraulic pressure control device 11 is a device represented by a side slip control device, for example, electronic stability control (ESC).

When the wheel cylinder hydraulic pressure control device 11 detects a side slip state based on a physical quantity representing a magnitude of a turning behavior of the vehicle 100, for example, a yaw rate, the wheel cylinder hydraulic pressure control device 11 is configured to stabilize the turning attitude of the vehicle 100 by automatically adjusting the hydraulic pressure of each of the wheel cylinders 5 to 8 to control the attitude of the vehicle 100.

The braking device of the vehicle 100 is not limited to a hydraulic friction brake, and may be, for example, an electric friction brake.

An engine torque operation member 12A represented by an accelerator pedal is configured to generate a torque command directed to an engine (internal combustion engine) 12B in response to an operation of the driver.

An engine control device 17 is configured to control the generated torque of the engine 12B, that is, the drive force of the vehicle 100, in response to the torque command by the engine torque operation member 12A.

A drive source of the vehicle 100 is not limited to an engine (internal combustion engine), and may be a motor or a combination of an engine and a motor.

A steering device 13 is a device capable of automatic steering, which is represented by an electric power steering device including a motor configured to generate a steering force.

Further, the vehicle motion control system includes an automatic driving control device 14, a communication gateway device 15, and a vehicle integrated motion control device 16.

The automatic driving control device 14 is configured to calculate information on a travel target including, for example, a target trajectory and a target speed, based on external information acquired from an external recognition sensor (not shown), for example, a camera.

The vehicle integrated motion control device 16 is configured to acquire information on the travel target from the automatic driving control device 14, and to acquire information on an actual motion state of the vehicle 100 from a vehicle motion state detection sensor described later.

Further, the vehicle integrated motion control device 16 is a control unit configured to obtain a control command of the operation amounts relating to braking, drive, and steering, and to output the obtained control command to each of the braking force generation device 10, the engine control device 17, and the steering device 13, which are actuator units relating to braking, drive, and steering. That is, the control unit has a function of performing calculations based on input information and outputting results of calculations.

Figure 2:
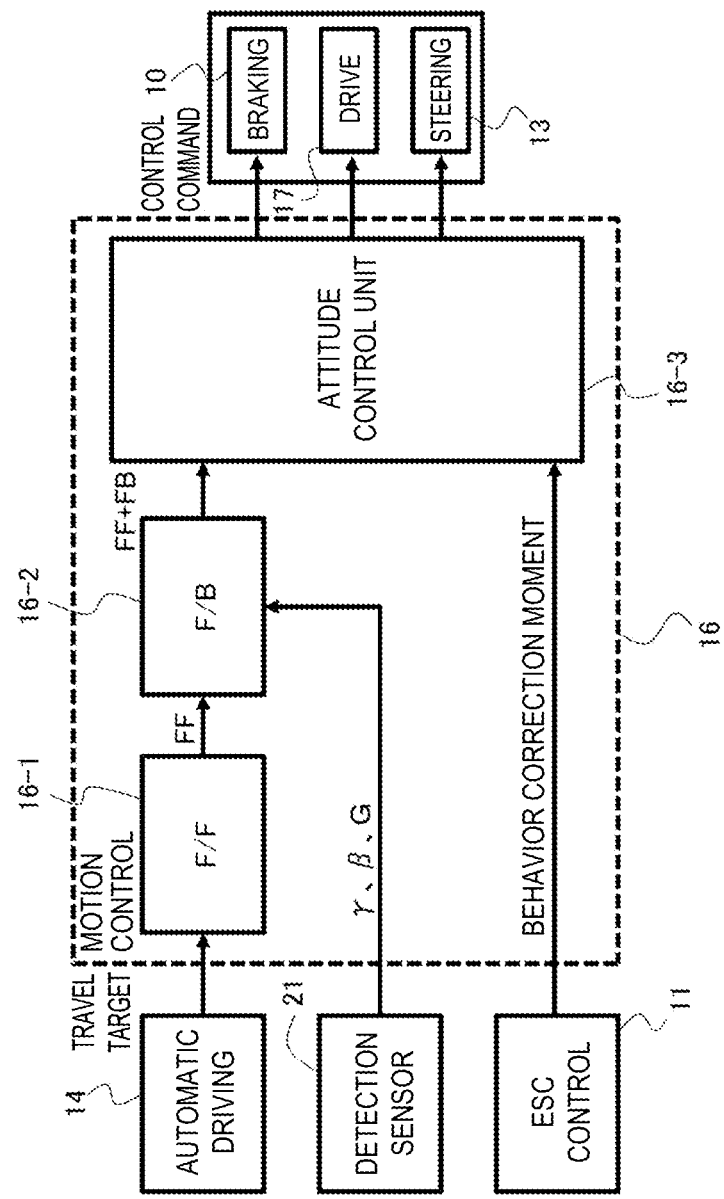
FIG. 2 is a functional block diagram of a vehicle integrated motion control device.

FIG. 2 is a functional block diagram for illustrating one aspect of the vehicle integrated motion control device 16.

The vehicle integrated motion control device 16 is an electronic control device including a microcomputer including, for example, a CPU, a ROM, and a RAM.

Further, the vehicle integrated motion control device 16 is a vehicle motion control device configured to control the motion of the vehicle 100 by outputting a control command to each of the braking force generation device 10 which is a braking actuator unit, the engine control device 17 which is a drive actuator unit, and the steering device 13 which is a steering actuator unit.

The vehicle integrated motion control device 16 acquires information on the travel target including, for example, the target trajectory and the target speed, from the automatic driving control device 14, and also acquires information on the actual motion state from a vehicle motion state detection sensor 21, and controls the motion of the vehicle 100 such that the vehicle 100 follows the travel target.

The vehicle motion state detection sensor 21 is configured to detect actual motion states, for example, a yaw rate y, a vehicle-body slip angle (3, and a lateral acceleration G, and outputs those pieces of information to the vehicle integrated motion control device 16.

Further, the vehicle integrated motion control device 16 acquires information on a behavior correction moment for suppressing an unstable behavior of the vehicle 100, for example, side slip, from the wheel cylinder hydraulic pressure control device 11.

The vehicle integrated motion control device 16 includes an FF operation amount calculation unit 16-1, an FB operation amount calculation unit 16-2, and an attitude control unit 16-3.

The FF operation amount calculation unit 16-1 is configured to calculate, based on a vehicle normative model in which the motion state of a vehicle traveling in accordance with the travel target is modeled by an equation of motion, a feedforward operation amount (first control amount) which allows the vehicle 100 to follow the travel target.

The vehicle normative model is a dynamic vehicle model in which the output of the system depends not only on the input at that time but also on past inputs and the internal state exhibited when the phenomenon started.

The FB operation amount calculation unit 16-2 is configured to calculate, based on a deviation between actual motion state amounts, for example, the yaw rate y, the vehicle-body slip angle (3, and the lateral acceleration G, acquired from the vehicle motion state detection sensor 21 and a target motion state amount, which is the solution of the vehicle normative model, a feedback operation amount which mitigates an impact of external disturbances and which allows the vehicle 100 to follow the travel target.

The FB operation amount calculation unit 16-2 outputs to the attitude control unit 16-3 a motion operation amount MOA (motion operation amount MOA=feedforward operation amount+feedback operation amount) determined from the feedforward operation amount (first control amount) and the feedback operation amount.

The motion operation amount MOA (second control amount) is expressed by, for example, forces (force Fx, force Fy, and moment M) in a vehicle coordinate system.

Figure 3:
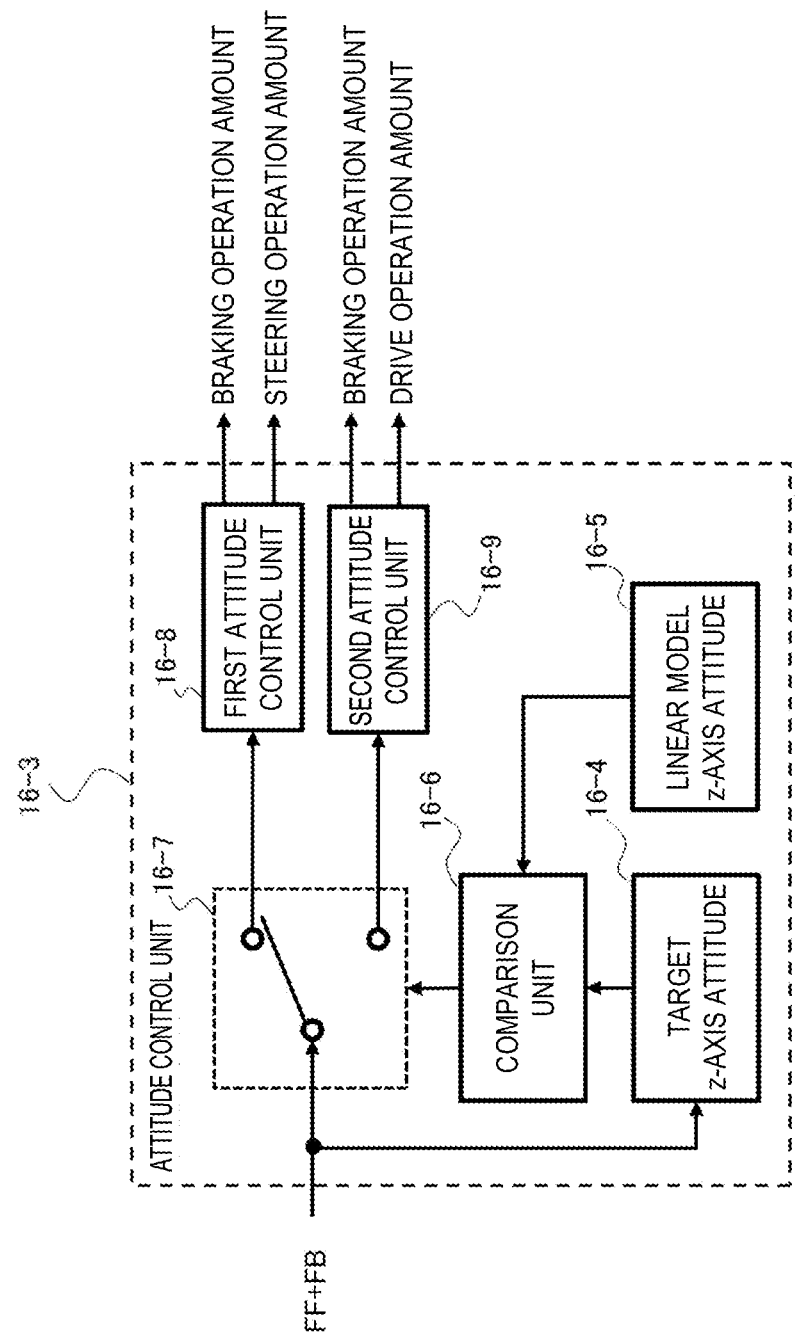
FIG. 3 is a functional block diagram of an attitude control unit of the vehicle integrated motion control device.

FIG. 3 is a functional block diagram for illustrating one aspect of the attitude control unit 16-3.

The attitude control unit 16-3 includes a target z-axis attitude calculation unit 16-4, a linear model z-axis attitude calculation unit 16-5, a comparison unit 16-6, a switching unit 16-7, a first attitude control unit 16-8, and a second attitude control unit 16-9.

The target z-axis attitude calculation unit 16-4 is configured to calculate a target z-axis attitude value, which is a physical quantity relating to a target vehicle attitude which is based on the target trajectory. The linear model z-axis attitude calculation unit 16-5 is configured to calculate a linear model z-axis attitude value, which is a physical quantity relating to the linear model vehicle attitude which is based on a linear model of the vehicle.

The z-axis attitude of the vehicle 100 is the rotational attitude about the z-axis, which is a vertical axis of the vehicle 100, that is, the attitude of the vehicle 100 in the yaw direction. The z-axis attitude becomes the vehicle-body slip angle $\beta$ as a final target.

However, the z-axis attitude command is not limited to a direct command in terms of the vehicle-body slip angle β. For example, in the command, only the moment M may be changed, or only Fy as the feedforward operation may be changed.

The vehicle-body slip angle β, which is an attitude value in the yaw direction, is an angle formed by the travel direction of the vehicle 100 and a vehicle reference line which passes through the center of gravity of the vehicle 100 and extends in a front-rear direction of the vehicle 100.

The comparison unit 16-6 is configured to compare the target z-axis attitude value with the linear model z-axis attitude value. The switching unit 16-7 is configured to activate any one of the first attitude control unit 16-8 and the second attitude control unit 16-9 based on the comparison result obtained by the comparison unit 16-6, and to cause one of the control units to control the z-axis attitude of the vehicle 100.

The first attitude control unit 16-8 is configured to control the z-axis attitude of the vehicle 100 by outputting braking and steering operation amounts. The second attitude control unit 16-9 is configured to control the z-axis attitude of the vehicle 100 by outputting braking and drive force operation amounts.

The first attitude control unit 16-8, the second attitude control unit 16-9, and the wheel cylinder hydraulic pressure control device 11 all perform control of applying a yaw moment to the vehicle 100.

The second attitude control unit 16-9 applies a yaw moment to the vehicle 100 by controlling braking and drive, the first attitude control unit 16-8 applies a yaw moment to the vehicle 100 by controlling braking and steering, and the wheel cylinder hydraulic pressure control device 11 applies a yaw moment to the vehicle 100 by controlling braking.

When the absolute value of the difference between the target z-axis attitude value and the linear model z-axis attitude value is equal to or larger than a threshold value, the switching unit 16-7 causes z-axis attitude control by the second attitude control unit 16-9 (braking and drive control command) to be performed. When the absolute value of the difference is smaller than the threshold value, the switching unit 16-7 causes z-axis attitude control by the first attitude control unit 16-8 (braking and steering control command) to be performed.

That is, the attitude control unit 16-3 implements attitude control by changing the distribution of the operation amounts relating to braking, drive, and steering based on the comparison between the target z-axis attitude value and the linear model z-axis attitude value.

Therefore, the attitude control unit 16-3 is not limited to a configuration implementing any one of z-axis attitude control by braking and steering operations and z-axis attitude control by braking and drive operations based on a comparison between a target z-axis attitude value and a linear model z-axis attitude value.

For example, when switching between z-axis attitude control by braking and steering operations and z-axis attitude control by braking and drive operations, the attitude control unit 16-3 can transiently perform z-axis attitude control by braking, drive, and steering operations, and can gradually change the braking, drive, and steering operation amounts from the values before the switch toward the command values after the switch.

Further, in the attitude control unit 16-3, the selection patterns of the operation targets among the three of braking, drive, and steering are not limited to the combination of braking and steering and the combination of braking and drive.

For example, the attitude control unit 16-3 can include a pattern in which one of braking, drive, and steering is selected as an operation target, and a pattern in which all of braking, drive, and steering are set as operation targets.

Moreover, the attitude control unit 16-3 can select the control target from among three or more patterns based on the comparison between the target z-axis attitude value and the linear model z-axis attitude value.

The z-axis attitude control by the attitude control unit 16-3 is now described in detail.

Figure 4:
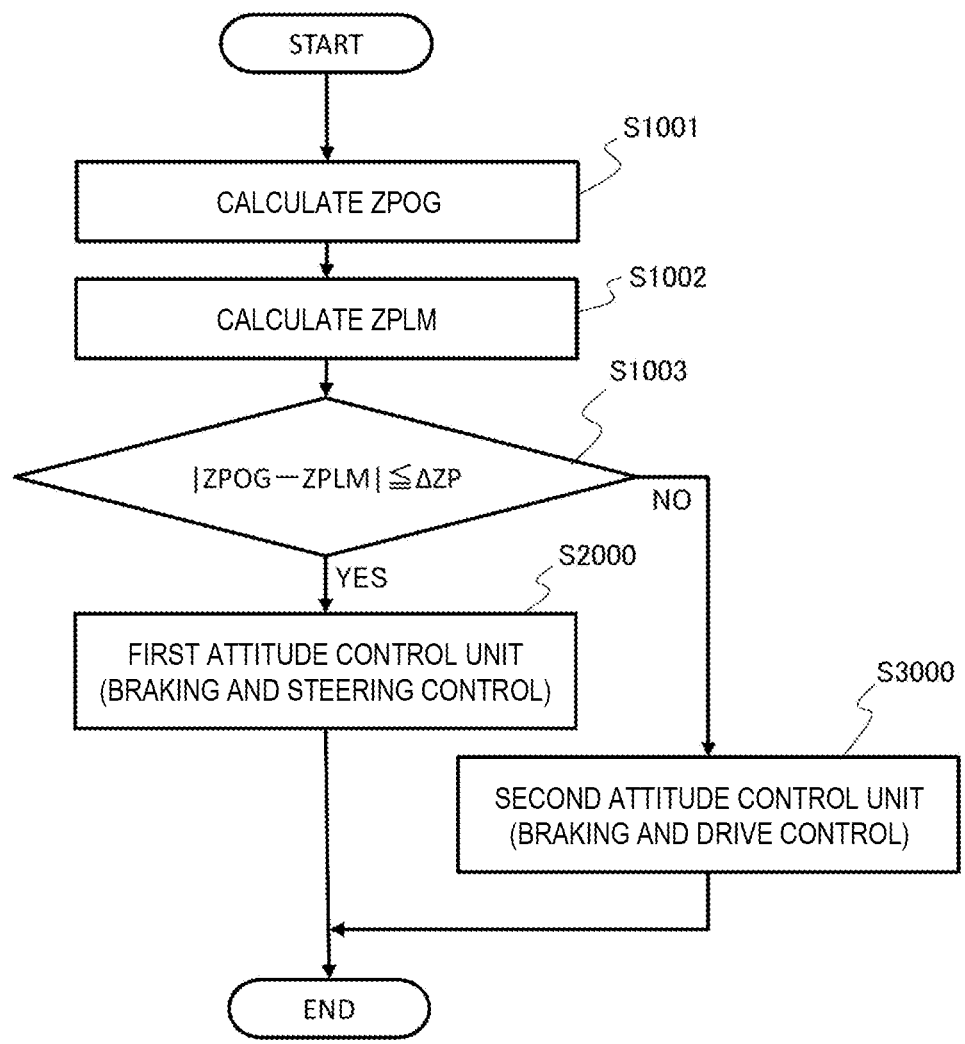
FIG. 4 is a flowchart for illustrating selection processing of a first attitude control unit and a second attitude control unit included in the attitude control unit.

FIG. 4 is a flowchart for illustrating one aspect of processing content by, among the control functions of the attitude control unit 16-3, the target z-axis attitude calculation unit 16-4, the linear model z-axis attitude calculation unit 16-5, the comparison unit 16-6, and the switching unit 16-7.

First, in Step S1001, the attitude control unit 16-3 calculates a target z-axis attitude value ZPOG (required z-axis attitude value).

The target z-axis attitude value ZPOG is a required value of the vehicle z-axis attitude for the vehicle 100 to follow the target trajectory. The attitude control unit 16-3 (target z-axis attitude calculation unit 16-4) determines the target z-axis attitude value ZPOG based on the feedforward operation amount calculated by the FF operation amount calculation unit 16-1 or based on the motion operation amount MOA (MOA=feedforward operation amount+feedback operation amount) calculated by the FB operation amount calculation unit 16-2.

Next, in Step S1002, the attitude control unit 16-3 calculates a linear model z-axis attitude value ZPLM (reference z-axis attitude value).

The linear model z-axis attitude value ZPLM is a vehicle z-axis attitude which is based on the linear model of the vehicle 100. The attitude control unit 16-3 (linear model z-axis attitude calculation unit 16-5) determines the linear model z-axis attitude value ZPLM by inputting to the linear model of the vehicle 100 driving conditions of the vehicle 100, for example, vehicle specifications, a vehicle speed, a turning radius, a steering angle, and a target lateral force.

In Step S1003 (by the comparison unit 16-6), the attitude control unit 16-3 compares the target z-axis attitude value ZPOG, which is the target value of the vehicle z-axis attitude, with the linear model z-axis attitude value ZPLM, which is the vehicle z-axis attitude determined based on the linear model of the vehicle 100.

In Step S1003, the attitude control unit 16-3 determines whether or not the target z-axis attitude value ZPOG is a value within a predetermined range (neighborhood area) centered on the linear model z-axis attitude value ZPLM.

That is, the attitude control unit 16-3 determines whether the absolute value of the deviation between the target z-axis attitude value ZPOG and the linear model z-axis attitude value ZPLM is in a state equal to a threshold value $\Delta ZP$ ($\Delta ZP > 0$) or smaller than the threshold value $\Delta ZP$ ($|ZPOG-ZPLM| \leq \Delta ZP$), or the absolute value of the deviation is in a state larger than the threshold value $\Delta ZP$ ($|ZPOG-ZPLM| > \Delta ZP$).

When the target z-axis attitude value ZPOG is within the predetermined range centered on the linear model z-axis attitude value ZPLM, the attitude control unit 16-3 (switching unit 16-7) advances the processing to Step S2000, and controls the z-axis attitude of the vehicle 100 by controlling braking and steering by the first attitude control unit 16-8.

In other words, when the target z-axis attitude value ZPOG is a value near the linear model z-axis attitude value ZPLM and there is not a large disturbance in the turning attitude of the vehicle 100, the attitude control unit 16-3 (switching unit 16-7) selects the first attitude control unit 16-8 from among the first attitude control unit 16-8 and the second attitude control unit 16-9, that is, selects z-axis attitude control by braking and steering.

Meanwhile, when the target z-axis attitude value ZPOG is outside the predetermined range centered on the linear model z-axis attitude value ZPLM, the attitude control unit 16-3 (switching unit 16-7) advances the processing to Step S3000, and controls the z-axis attitude of the vehicle 100 by controlling braking and drive by the second attitude control unit 16-9.

In other words, when the target z-axis attitude value ZPOG is not a value near the linear model z-axis attitude value ZPLM and there is a large disturbance in the turning attitude of the vehicle 100, the attitude control unit 16-3 (switching unit 16-7) selects the second attitude control unit 16-9 from among the first attitude control unit 16-8 and the second attitude control unit 16-9, that is, selects z-axis attitude control by braking and drive.

Figure 5:
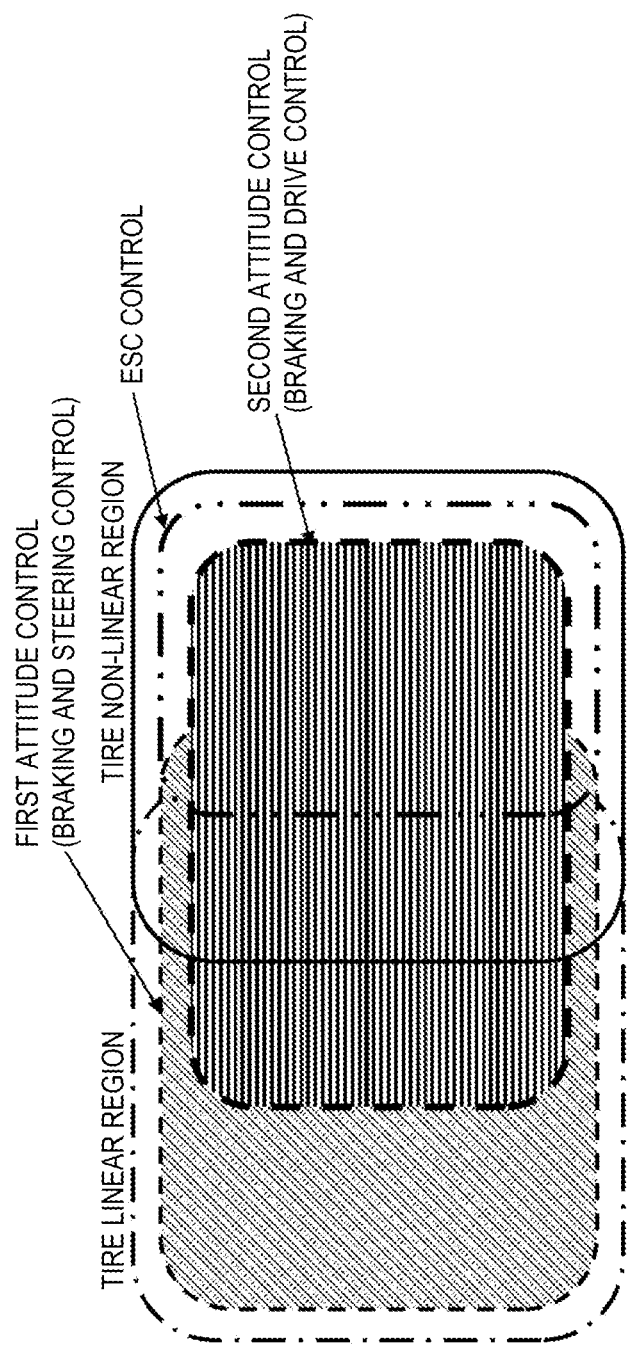
FIG. 5 is a diagram for illustrating an activation region of the first attitude control unit, the second attitude control unit, and a wheel cylinder hydraulic pressure control device (ESC).

In this way, the attitude control unit 16-3 (switching unit 16-7) expands the region in which the travel requirement can be satisfied toward a tire non-linear region more than when turning behavior is controlled through use of only the first attitude control unit 16-8 which controls braking and steering, and can satisfy the travel requirement to the maximum extent, by activating the second attitude control unit 16-9 which controls braking and drive when the deviation between the target z-axis attitude value ZPOG and the linear model z-axis attitude value ZPLM is larger than a determination value (see FIG. 5).

Figure 6:
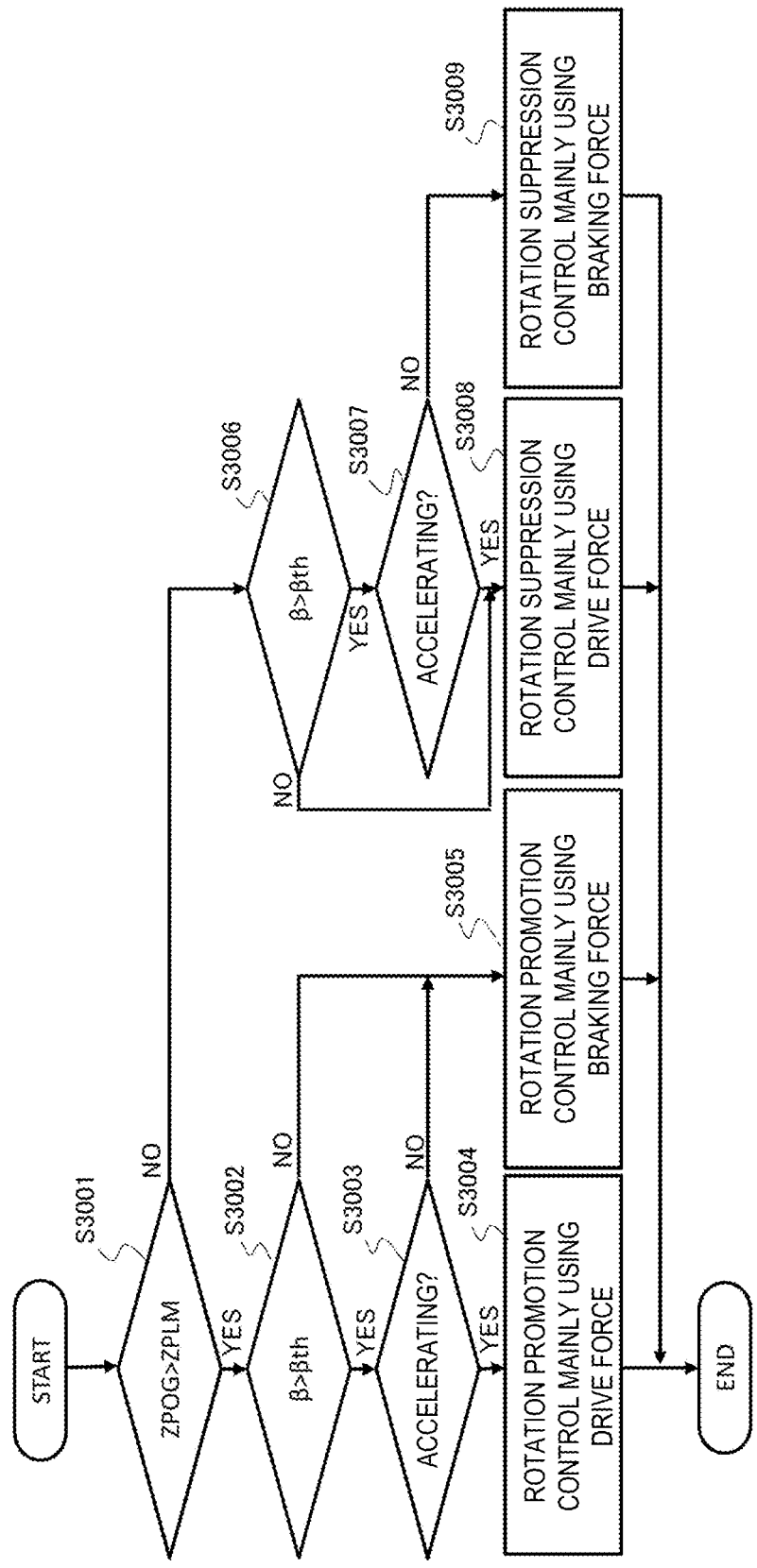
FIG. 6 is a flowchart for illustrating a braking and drive control procedure by the second attitude control unit.

FIG. 6 is a flowchart for illustrating a braking and drive control procedure by the second attitude control unit 16-9.

As described above, the second attitude control unit 16-9 controls braking and drive in accordance with the procedure illustrated in the flowchart of FIG. 6 when the deviation between the target z-axis attitude value ZPOG and the linear model z-axis attitude value ZPLM is larger than the determination value.

First, in Step S3001, the second attitude control unit 16-9 determines whether or not the target z-axis attitude value ZPOG is larger than the linear model z-axis attitude value ZPLM.

A state in which the target z-axis attitude value ZPOG is larger than the linear model z-axis attitude value ZPLM is a state in which there is a requirement to increase the vehicle-body slip angle $\beta$, that is, there is a requirement to turn the direction of the vehicle 100 toward a turning inner side. Such a requirement indicates that the turning behavior of the vehicle 100 has an understeer tendency.

Meanwhile, a state in which the target z-axis attitude value ZPOG is smaller than the linear model z-axis attitude value ZPLM is a state in which there is a requirement to decrease the vehicle-body slip angle $\beta$, that is, there is a requirement to turn the direction of the vehicle 100 toward a turning outer side. Such a requirement indicates that the turning behavior of the vehicle 100 has an oversteer tendency (is turning outward).

When the target z-axis attitude value ZPOG is larger than the linear model z-axis attitude value ZPLM due to the understeer tendency of the behavior of the vehicle 100, the second attitude control unit 16-9 advances to Step S3002, and determines whether or not a detected value or an estimated value of the vehicle-body slip angle $\beta$ of the actual vehicle (hereinafter referred to as "actual vehicle-body slip angle $\beta$") exceeds a threshold value $\beta$TH (predetermined angle).

When the actual vehicle-body slip angle $\beta$ exceeds the threshold value $\beta$TH, the second attitude control unit 16-9 advances to Step S3003, and determines whether or not the vehicle 100 is accelerating.

When the behavior of the vehicle 100 has an understeer tendency, and the actual vehicle-body slip angle $\beta$ exceeds the threshold value $\beta$TH and the vehicle 100 is accelerating, the second attitude control unit 16-9 advances to Step S3004.

In Step 3004, the second attitude control unit 16-9 applies a yaw moment for turning the vehicle 100 in the direction of the turning inner side by mainly controlling the drive to promote rotation of the vehicle 100 about the z-axis, to thereby suppress the understeer tendency.

For example, when the vehicle 100 is a rear-wheel drive vehicle, in Step S3004, the second attitude control unit 16-9 increases the drive force (output torque of the engine) to cause a so-called drift travel state, turns the vehicle 100 toward the inner side of the target turning trajectory, and decreases the drive force when the vehicle 100 changes to a neutral steer or an oversteer tendency.

Further, when the vehicle 100 is a front-wheel drive vehicle, in Step S3004, the second attitude control unit 16-9 decreases the drive force (output torque of the engine) to induce so-called "power-off reaction," turns the vehicle 100 toward the inner side of the target turning trajectory, and restores the drive force when the vehicle 100 changes to a neutral steer or an oversteer tendency.

Under the state in which the actual vehicle-body slip angle $\beta$ is small, a yaw moment may not be applied to the vehicle 100 even when the drive force is changed, and conversely, rotation of the vehicle 100 about the z-axis may be suppressed.

Therefore, when the actual vehicle-body slip angle $\beta$ exceeds the threshold value $\beta$TH, the second attitude control unit 16-9 applies a yaw moment to the vehicle 100 by drive control. That is, the threshold value $\beta$TH is a value adapted to allow whether or not a yaw moment can be applied to the vehicle 100 by drive control to be distinguished.

In the rotation promotion processing mainly using drive control in Step S3004, the second attitude control unit 16-9 can additionally apply a yaw moment to the vehicle 100 by braking force control, and rotation suppression by drive control in Step S3008 described later can be performed in a similar manner.

Meanwhile, when the behavior of the vehicle 100 has an understeer tendency, and the actual vehicle-body slip angle $\beta$ is equal to or smaller than the threshold value $\beta$TH, the second attitude control unit 16-9 advances to Step S3005.

When the actual vehicle-body slip angle $\beta$ is equal to or smaller than the threshold value $\beta$TH, a sufficient yaw moment cannot be applied to the vehicle 100 by drive control.

Therefore, in Step S3005, the second attitude control unit 16-9 performs braking force distribution control of applying a braking force to the wheels on the turning inner side to apply a yaw moment to vehicle 100, to thereby promote rotation of the vehicle 100 about the z-axis.

When the behavior of the vehicle 100 changes to a neutral steer or an oversteer tendency, the second attitude control unit 16-9 decreases the yaw moment by braking, and attempts to restore the vehicle speed later by controlling the drive when the vehicle is in accelerating state, for example.

Further, the second attitude control unit 16-9 advances to Step S3005 also when the behavior of the vehicle 100 has an understeer tendency and the actual vehicle-body slip angle β exceeds the threshold value βTH but the vehicle 100 is decelerating or coasting rather than accelerating.

In this case, the second attitude control unit 16-9 performs braking force distribution control of applying a braking force to the wheels on the turning inner side to apply a yaw moment to the vehicle 100, promotes rotation about the z-axis while suppressing acceleration by the vehicle 100 arising together with the attitude control, and when the behavior of the vehicle 100 changes to a neutral steer or an oversteer tendency, decreases the yaw moment applied by braking.

When the target z-axis attitude value ZPOG is the same as or smaller than the linear model z-axis attitude value ZPLM and the turning behavior of the vehicle 100 has an oversteer tendency (is turning inward), the second attitude control unit 16-9 advances from Step S3001 to Step S3006.

In Step 3006, the second attitude control unit 16-9 determines whether or not the detected value of the actual vehicle-body slip angle β exceeds the threshold value βTH (predetermined angle).

When the actual vehicle-body slip angle β exceeds the threshold value βTH, the second attitude control unit 16-9 advances to Step S3007, and determines whether or not the vehicle 100 is accelerating.

When the behavior of the vehicle 100 has an oversteer tendency, the actual vehicle-body slip angle β exceeds the threshold value βTH, and the vehicle 100 is accelerating, the second attitude control unit 16-9 advances to Step S3008, and suppresses the rotation of the vehicle 100 about the z-axis by mainly controlling the drive (output torque of the engine).

When the processing has advanced from Step S3007 to Step S3008, the second attitude control unit 16-9 applies a yaw moment for suppressing the rotation of the vehicle 100 by decreasing the drive force, and when the behavior of the vehicle 100 changes to a neutral steer or an understeer tendency, the second attitude control unit 16-9 restores the drive force.

Further, when the behavior of the vehicle 100 has an oversteer tendency, the actual vehicle-body slip angle β exceeds the threshold value βTH, but the vehicle 100 is not accelerating, the second attitude control unit 16-9 advances to Step S3009, and suppresses the rotation of the vehicle 100 about the z-axis by mainly controlling the brake.

In Step S3009, the second attitude control unit 16-9 performs braking force distribution control of applying a braking force to the wheels on the turning outer side to generate a yaw moment for suppressing the rotation of the vehicle 100 about the z-axis, and when the behavior of the vehicle 100 changes to a neutral steer or an understeer tendency, the second attitude control unit 16-9 decreases the yaw moment in the direction of suppressing rotation by distributing the braking force.

Further, when the behavior of the vehicle 100 has an oversteer tendency, but the actual vehicle-body slip angle β is equal to or smaller than the threshold value βTH, the second attitude control unit 16-9 bypasses Step S3007 to advance to Step S3008, and suppresses the rotation of the vehicle 100 about the z-axis by mainly controlling the drive (output torque of the engine).

When the second attitude control unit 16-9 has bypassed Step S3007 and advanced from Step S3006 to Step S3008, during acceleration of the vehicle 100, the rotation of the vehicle 100 about the z-axis is suppressed to intentionally achieve a pushing-understeer state by increasing the drive force, and when the vehicle 100 changes to an understeer tendency, the drive force is decreased.

Further, when the second attitude control unit 16-9 has bypassed Step S3007 and advanced from Step S3006 to Step S3008, in a case in which the vehicle 100 is decelerating or coasting rather than accelerating, the second attitude control unit 16-9 suppresses the rotation of the vehicle 100 about the z-axis by decreasing the drive force, for example, by setting the drive force to zero.

Figure 7:
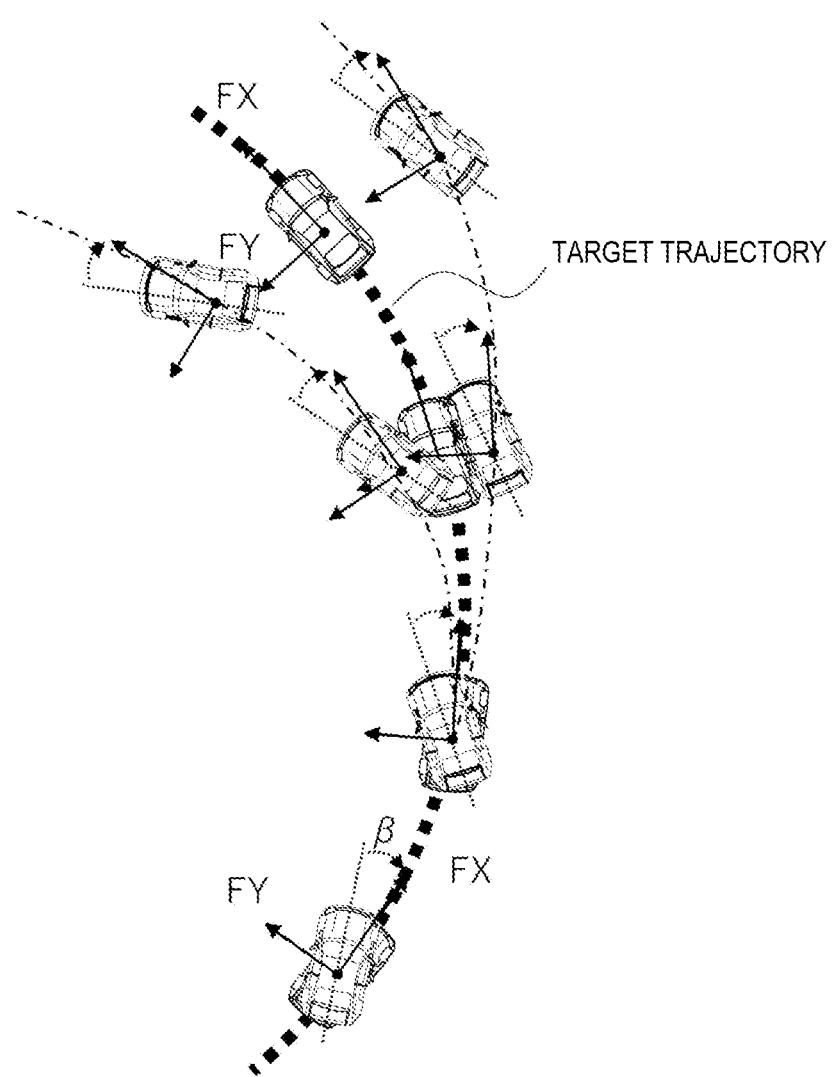
FIG. 7 is a diagram for illustrating a state of a vehicle in a turning state.
Figure 8:
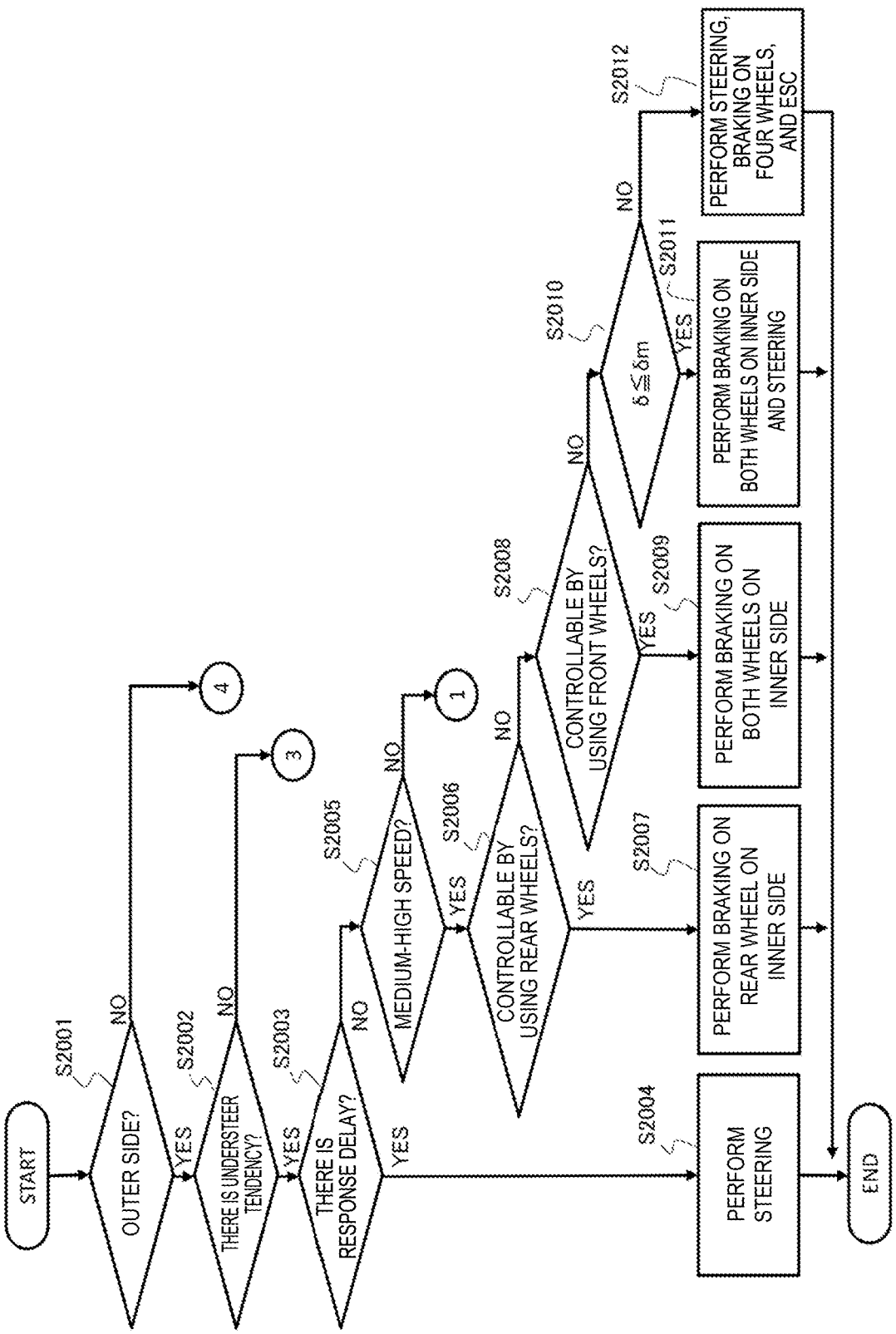
FIG. 8 is a flowchart for illustrating a braking and steering control procedure by the first attitude control unit.

In this way, even when the vehicle behavior unexpectedly becomes an oversteer tendency or an understeer tendency, the second attitude control unit 16-9 controls the turning behavior by controlling the braking and the drive to restore the vehicle behavior to a linear behavior, and therefore it is possible to improve the ability to follow the travel target (target trajectory) (see FIG. 7).

Further, in the braking and drive control by the second attitude control unit 16-9, whether or not the travel requirement is satisfied is not evaluated, and therefore it is possible to suppress a deterioration in the ability to follow the travel target due to a response delay in the motion control.

FIG. 8 to FIG. 15 are flowcharts for illustrating braking and steering control by the first attitude control unit 16-8, that is, the processing content of Step S2000.

First, in Step S2001, the first attitude control unit 16-8 determines whether or not the position of the own vehicle is at an outer side or an inner side of the target turning trajectory.

When the own-vehicle position is at an outer side of the target turning trajectory, the first attitude control unit 16-8 advances to Step S2002, and determines whether or not the own-vehicle behavior has an understeer tendency.

When the own-vehicle behavior has an understeer tendency, the first attitude control unit 16-8 advances to Step S2003, and determines whether or not there is a response delay in the steering control.

The response delay in the steering control is a delay in following the actual steering angle to the target steering angle, and can be determined by, for example, the first attitude control unit 16-8 determining whether or not there is a response delay in the steering control based on a time constant used when the actual steering angle follows a change in the target steering angle, for example.

For example, the first attitude control unit 16-8 determines that there is a response delay in the steering control when the time constant used when the actual steering angle follows a change in the target steering angle is larger than a determination value.

When there is a response delay in the steering control, the first attitude control unit 16-8 advances to Step S2004, and suppresses the understeer tendency by performing steering control to direct the traveling direction of the vehicle 100 further toward the turning inner side.

The understeer tendency is due to the response delay in the steering control, and therefore in Step S2004, the first attitude control unit 16-8 increases the control amount of the steering device 13 to promote an increase in a steering angle S.

Meanwhile, when it is determined in Step S2003 that the response delay in the steering control is sufficiently small, the first attitude control unit 16-8 advances to Step S2005, and determines whether or not the vehicle speed is a predetermined speed (medium speed) or faster, that is, whether or not the vehicle 100 is traveling at a medium-high speed.

When the vehicle speed is the predetermined speed or faster and the vehicle 100 is traveling at a medium-high speed, the first attitude control unit 16-8 advances to Step S2006, and determines whether or not the yaw moment required for suppressing the understeer tendency can be generated by distribution of the braking force to the rear wheels.

The first attitude control unit 16-8 determines the required yaw moment from, for example, a behavior correction moment, the feedforward operation amount, and the feedback operation amount.

When the required yaw moment can be generated by distribution of the braking force to the rear wheels, the first attitude control unit 16-8 advances to Step S2007, and applies the braking force to the rear wheel on the turning inner side to generate a yaw moment for suppressing the understeer tendency.

In a case in which the vehicle speed is the medium speed or the high speed, a braking feeling is not easily felt even when a braking force is applied to generate a yaw moment. Therefore, in Step 2007, the first attitude control unit 16-8 generates the yaw moment for suppressing the understeer tendency by mainly controlling braking.

Meanwhile, when the required yaw moment cannot be generated by distribution of the braking force to the rear wheels, the first attitude control unit 16-8 advances to Step S2008, and determines whether or not the required yaw moment can be generated by distribution of the braking force to the front wheels.

When the required yaw moment can be generated by distribution of the braking force to the front wheels, the first attitude control unit 16-8 advances to Step S2009, and applies the braking force to the rear wheel and the front wheel on the turning inner side to generate a yaw moment for suppressing the understeer tendency.

Further, when the required yaw moment cannot be generated by distribution of the braking force to the front wheels, the first attitude control unit 16-8 advances to Step S2010, compares a threshold value $\delta m$, which is a steering angle equivalent to the lateral force obtained by adding a margin to a maximum lateral force which can be generated by steering, with the steering angle $\delta$ of the actual vehicle (hereinafter referred to as "actual steering angle $\delta$"), and determines whether or not the actual steering angle $\delta$ is equal to or smaller than the threshold value $\delta m$.

That is, the first attitude control unit 16-8 estimates that a yaw moment for suppressing the understeer tendency can be applied by steering control when the actual steering angle $\delta$ is equal to or smaller than the threshold value $\delta m$.

Meanwhile, the first attitude control unit 16-8 estimates that a yaw moment for suppressing the understeer tendency cannot be sufficiently applied by steering control when the actual steering angle $\delta$ exceeds the threshold value $\delta m$.

When the yaw moment for suppressing the understeer tendency can be applied by steering control, the first attitude control unit 16-8 advances to Step S2011.

In Step S2011, the first attitude control unit 16-8 applies the braking force to the rear wheel and the front wheel on the turning inner side, further increases the actual steering angle $\delta$, and applies the yaw moment for directing the traveling direction of the vehicle 100 further toward the turning inner side to suppress the understeer tendency.

Meanwhile, when the actual steering angle $\delta$ exceeds the threshold value $\delta m$ and the yaw moment for suppressing the understeer tendency cannot be sufficiently applied even when steering control is performed, the first attitude control unit 16-8 advances to Step S2012.

In Step S2012, the first attitude control unit 16-8 increases the actual steering angle $\delta$, applies the braking force to the four wheels to decelerate the wheels, and performs hydraulic pressure adjustment of the wheel cylinders 5 to 8 based on the behavior correction moment from the wheel cylinder hydraulic pressure control device 11 (side slip prevention device).

The first attitude control unit 16-8 can, in Step S2012, shift to braking and drive control by the second attitude control unit 16-9.

Figure 9:
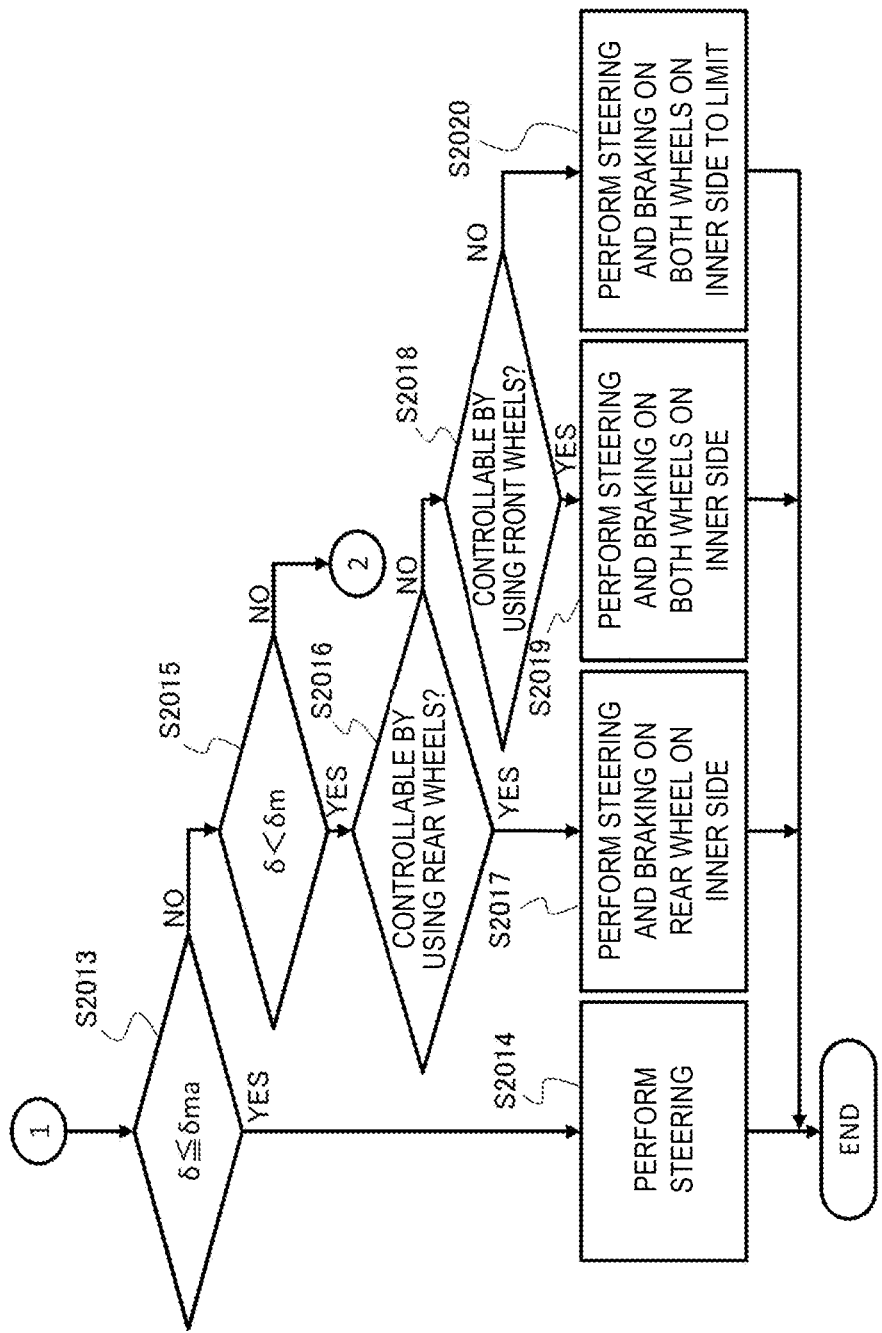
FIG. 9 is a flowchart for illustrating the braking and steering control procedure by the first attitude control unit.
Figure 10:
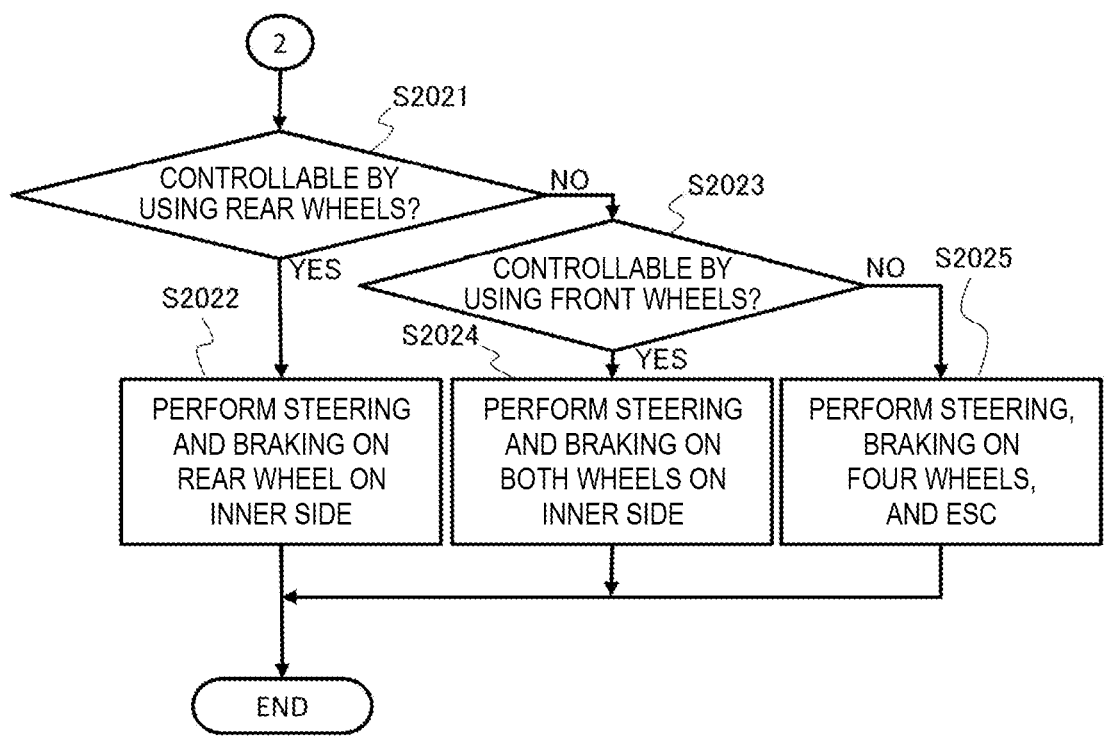
FIG. 10 is a flowchart for illustrating the braking and steering control procedure by the first attitude control unit.
Figure 11:
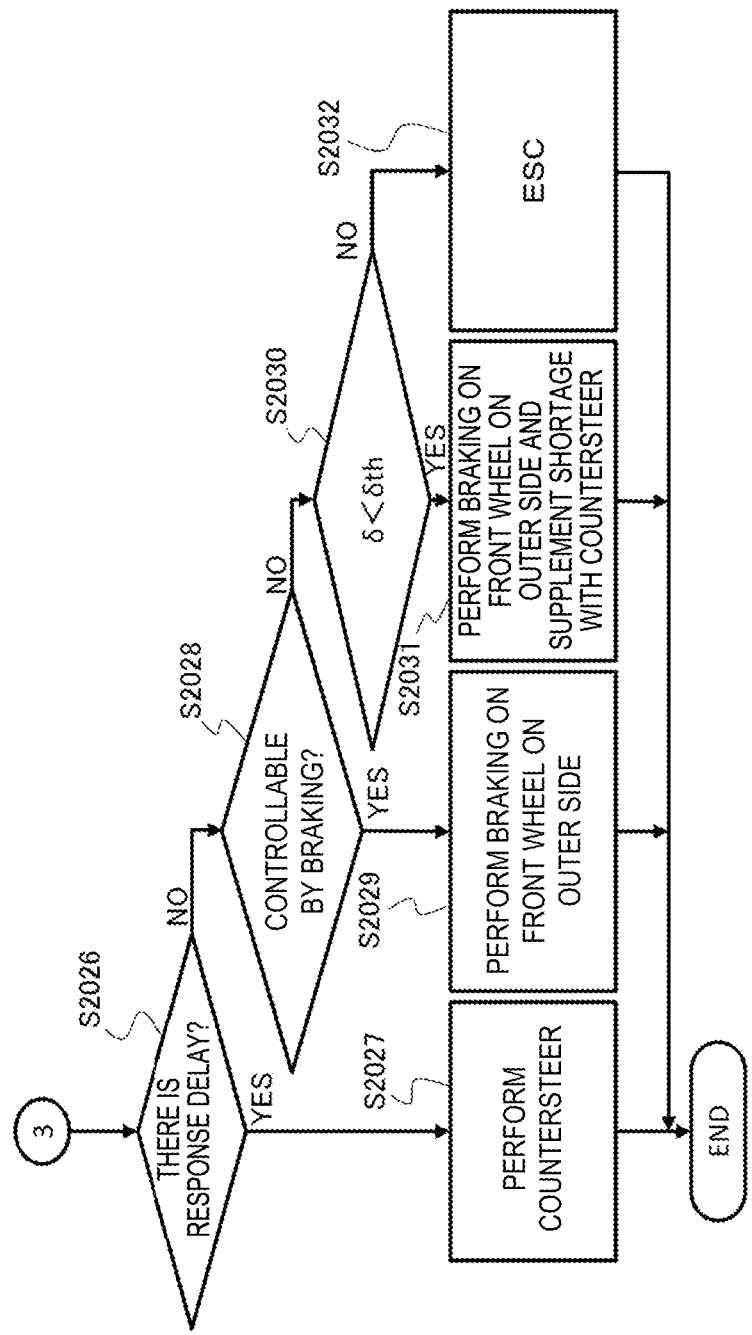
FIG. 11 is a flowchart for illustrating the braking and steering control procedure by the first attitude control unit.

When it is determined in Step S2005 that the vehicle speed is in a low-speed state lower than a predetermined speed, the first attitude control unit 16-8 advances to Step S2013 (see FIG. 9).

In Step S2013, the first attitude control unit 16-8 determines whether or not the actual steering angle $\delta$ is equal to or smaller than a threshold value $\delta ma$ corresponding to the maximum lateral force which can be generated by steering.

When the actual steering angle $\delta$ is equal to or smaller than the threshold value $\delta ma$, the first attitude control unit 16-8 determines that the vehicle 100 is in a state in which a yaw moment for suppressing the understeer tendency can be generated by steering control, and advances to Step S2014.

In Step S2014, the first attitude control unit 16-8 increases the actual steering angle $\delta$ and applies the yaw moment for directing the traveling direction of the vehicle 100 further toward the turning inner side to suppress the understeer tendency of the vehicle behavior.

Meanwhile, when the actual steering angle $\delta$ exceeds the threshold value $\delta ma$, the first attitude control unit 16-8 advances to Step S2015, and determines whether or not the actual steering angle $\delta$ is smaller than the threshold value $\delta m$ ($\delta m > \delta ma$).

When the actual steering angle $\delta$ is smaller than the threshold value $\delta m$, the first attitude control unit 16-8 advances to Step S2016, and determines whether or not the yaw moment required for suppressing the understeer tendency is a yaw moment which can be generated by distribution of the braking force to the rear wheels.

When the yaw moment required for suppressing the understeer tendency is a yaw moment which can be generated by distribution of the braking force to the rear wheels, the first attitude control unit 16-8 advances to Step S2017, increases the actual steering angle $\delta$, and applies the braking force to the rear wheel on the turning inner side to apply a yaw moment in the direction for suppressing the understeer tendency.

Further, when it is determined in Step S2016 that the yaw moment required for suppressing the understeer tendency is larger than the yaw moment which can be generated by distribution of the braking force to the rear wheels, the first attitude control unit 16-8 advances to Step S2018.

In Step S2018, the first attitude control unit 16-8 determines whether or not the yaw moment required for suppressing the understeer tendency can be generated by distribution of the braking force to the front wheels.

When the yaw moment required for suppressing the understeer tendency can be generated by distribution of the braking force to the front wheels, the first attitude control unit 16-8 advances to Step S2019, increases the actual steering angle $\delta$, and applies the braking force to the rear wheel and the front wheel on the turning inner side to apply a yaw moment in the direction for suppressing the understeer tendency.

When the yaw moment required for suppressing the understeer tendency cannot be generated by distribution of the braking force to the front wheels, the first attitude control unit 16-8 advances to Step S2020, increases the braking force of the rear wheel and the front wheel on the turning inner side to a predetermined limit value, and then increases the actual steering angle δ to a predetermined limit value to suppress the understeer tendency.

Further, when it is determined in Step S2015 that the actual steering angle δ is equal to or larger than the threshold value δm, the first attitude control unit 16-8 advances to Step S2021 (see FIG. 10), and determines whether or not the yaw moment required for suppressing the understeer tendency is a yaw moment which can be generated by distribution of the braking force to the rear wheels.

When the yaw moment required for suppressing the understeer tendency is a yaw moment which can be generated by distribution of the braking force to the rear wheels, the first attitude control unit 16-8 advances to Step S2022, and under a state in which the actual steering angle δ has reached the predetermined limit value, the first attitude control unit 16-8 generates the yaw moment shortage by applying a braking force to the rear wheel on the turning inner side.

Further, when the yaw moment required for suppressing the understeer tendency exceeds the yaw moment which can be generated by distribution of the braking force to the rear wheels, the first attitude control unit 16-8 advances to Step S2023, and determines whether or not the yaw moment required for suppressing the understeer tendency can be generated by distribution of the braking force to the front wheels.

When the yaw moment required for suppressing the understeer tendency can be generated by distribution of the braking force to the front wheels, the first attitude control unit 16-8 advances to Step S2024, and under a state in which the actual steering angle δ has reached the predetermined limit value, generates the yaw moment shortage by applying a braking force to the rear wheel and the front wheel on the turning inner side.

Meanwhile, when the yaw moment required for suppressing the understeer tendency cannot be generated by distribution of the braking force to the front wheels, the first attitude control unit 16-8 advances from Step S2023 to Step S2025, and under a state in which the actual steering angle δ has reached the predetermined limit value, applies the braking force to the four wheels to decelerate the wheels, and performs hydraulic pressure adjustment of the wheel cylinders 5 to 8 based on the behavior correction moment from the wheel cylinder hydraulic pressure control device 11 (side slip prevention device).

The first attitude control unit 16-8 can, in Step S2025, shift to vehicle z-axis attitude control (braking and drive control) by the second attitude control unit 16-9.

Further, when it is determined in Step S2002 that the own-vehicle behavior does not have an understeer tendency and has an oversteer tendency, the first attitude control unit 16-8 advances to Step S2026 (see FIG. 11), and determines whether or not there is a response delay in the steering control.

When there is a response delay in the steering control, the first attitude control unit 16-8 advances to Step S2027, and performs steering control (countersteer) in which steering is performed in the direction opposite to the traveling direction to suppress the oversteer tendency.

As a result of the fact that there is a response delay in the steering control, in Step S2027, the first attitude control unit 16-8 increases the control amount of the steering device 13 to promote restoration to the actual steering angle δ.

Meanwhile, when the response delay in the steering control is sufficiently small, the first attitude control unit 16-8 advances to Step S2028, and determines whether or not the yaw moment required for suppressing the oversteer tendency at the outer side of the target trajectory can be generated by distribution of the braking force to the front wheels.

When the required yaw moment can be generated by distribution of the braking force to the front wheels, the first attitude control unit 16-8 advances to Step S2029, and applies the braking force to the front wheels on the turning outer side to apply a yaw moment for suppressing the oversteer tendency.

When the required yaw moment cannot be generated by distribution of the braking force to the front wheels, the first attitude control unit 16-8 advances to Step S2030, and determines whether or not the actual steering angle δ is smaller than an angle δth obtained by adding a predetermined angle Δθ to the actual vehicle-body slip angle β (δth=β+Δθ).

When the actual steering angle δ is smaller than the angle δth, the first attitude control unit 16-8 advances to Step S2031, applies a braking force to the front wheels on the turning outer side to apply a yaw moment for suppressing the oversteer tendency, and supplements the yaw moment shortage in the braking force control with countersteer having the angle δth as the limit.

When the actual steering angle δ is equal to or larger than the angle δth, the first attitude control unit 16-8 advances to Step S2032, and performs hydraulic pressure adjustment of the wheel cylinders 5 to 8 based on the behavior correction moment from the wheel cylinder hydraulic pressure control device 11 (side slip prevention device), or shifts to vehicle z-axis attitude control (braking and drive control) by the second attitude control unit 16-9.

The above-mentioned processing is the processing executed when the first attitude control unit 16-8 determines in Step S2001 that the own-vehicle position is at an outer side of the target turning trajectory.

Figure 12:
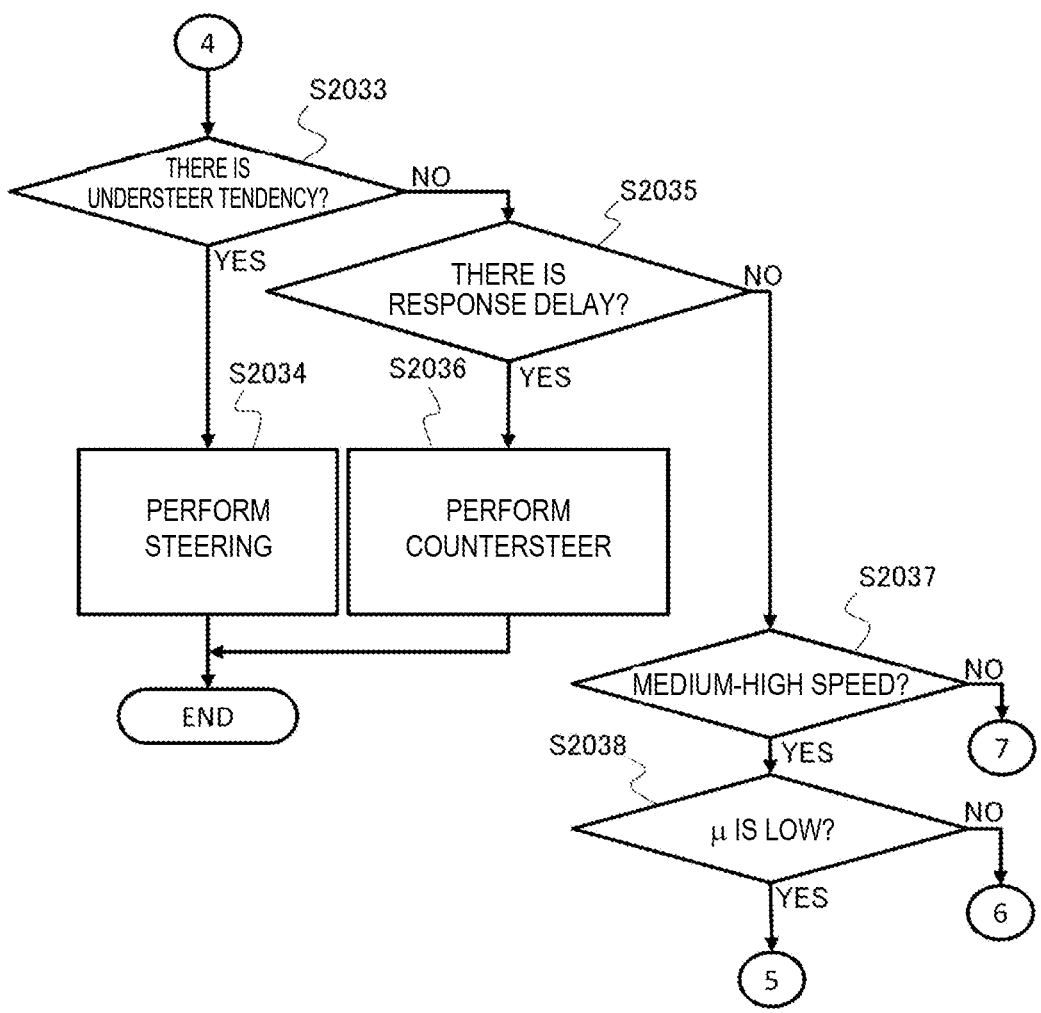
FIG. 12 is a flowchart for illustrating the braking and steering control procedure by the first attitude control unit.

When it is determined in Step S2001 that the own-vehicle position is at an inner side of the target turning trajectory, the first attitude control unit 16-8 advances to Step S2033 (see FIG. 12).

In Step S2033, the first attitude control unit 16-8 determines whether or not the turning behavior of the vehicle 100 has an understeer tendency.

When the own-vehicle behavior has an understeer tendency, the first attitude control unit 16-8 advances to Step S2034, and suppresses the understeer tendency by steering control of increasing the actual steering angle S.

Meanwhile, when the own-vehicle position is at an inner side of the target turning trajectory and the turning behavior of the vehicle 100 has an oversteer tendency, the first attitude control unit 16-8 advances to Step S2035, and determines whether or not there is a response delay in the steering control.

When there is a response delay in the steering control, the first attitude control unit 16-8 advances to Step S2036, and performs countersteer as the steering control to suppress the oversteer tendency.

As a result of the fact that there is a response delay in the steering control, in Step S2036, the first attitude control unit 16-8 increases the control amount of the steering device 13 to promote restoration to the actual steering angle S.

When the response delay in the steering control is sufficiently small, the first attitude control unit 16-8 advances from Step S2035 to Step S2037, and determines whether or not the vehicle speed is a predetermined speed (medium speed) or a medium-high speed faster than the predetermined speed.

When the vehicle speed is a medium-high speed, the first attitude control unit 16-8 advances to Step S2038, and determines whether or not a friction coefficient μ of the road surface on which the vehicle 100 is traveling is a predetermined value or smaller, that is, whether or not the vehicle 100 is traveling on a slippery road surface, for example, a wet road surface or a snowy road.

The first attitude control unit 16-8 can estimate the information on the friction coefficient μ of the road surface from the traveling state, for example, the slip of the wheels 1 to 4, acquire the information from another electronic control device mounted on the vehicle 100 via an in-vehicle network, or acquire the information by wireless communication from a device external to the vehicle 100.

Figure 13:
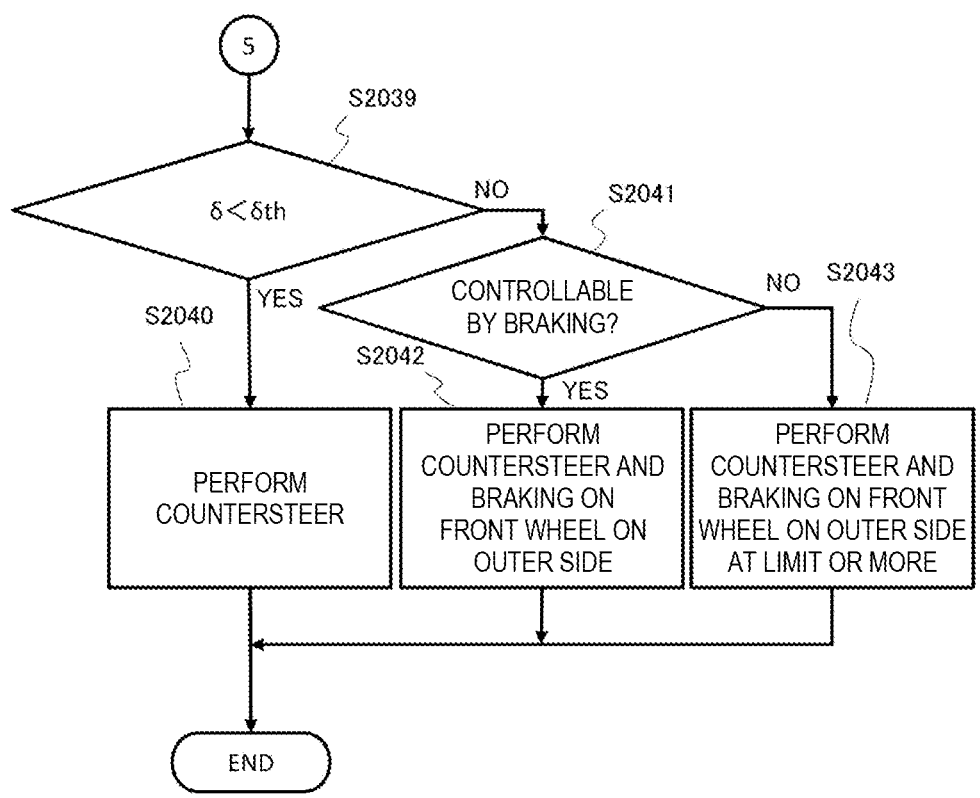
FIG. 13 is a flowchart for illustrating the braking and steering control procedure by the first attitude control unit.

When the position of the vehicle 100 is at an inner side of the target turning trajectory, the turning behavior of the vehicle 100 has an oversteer tendency, and the vehicle 100 is traveling on a slippery road surface at a medium-high speed, the first attitude control unit 16-8 advances from Step S2038 to Step S2039 (see FIG. 13).

In Step S2039, the first attitude control unit 16-8 determines whether or not the actual steering angle δ is smaller than the angle δth obtained by adding the predetermined angle Δθ to the actual vehicle-body slip angle β.

When the actual steering angle δ is smaller than the angle δth, the first attitude control unit 16-8 advances to Step S2040, and performs countersteer with the angle δth as the limit as steering control to suppress the oversteer tendency.

Meanwhile, when the actual steering angle δ is equal to or larger than the angle δth, the first attitude control unit 16-8 advances to Step S2041, and determines whether or not the yaw moment required for suppressing the oversteer tendency at the inner side of the target trajectory can be generated by distribution of the braking force to the front wheels.

When the required yaw moment can be generated by distribution of the braking force to the front wheels, the first attitude control unit 16-8 advances to Step S2042, and under a state in which the countersteer has reached the limit angle δth, performs braking control of applying the braking force to the front wheels on the turning outer side to suppress the oversteer tendency.

Further, when the required yaw moment cannot be generated by distribution of the braking force to the front wheels, the first attitude control unit 16-8 advances to Step S2043, and under a state in which the countersteer has reached the limit angle δth, performs braking control of applying a braking force of the limit or more to the front wheels on the turning outer side to suppress the oversteer tendency.

Figure 14:
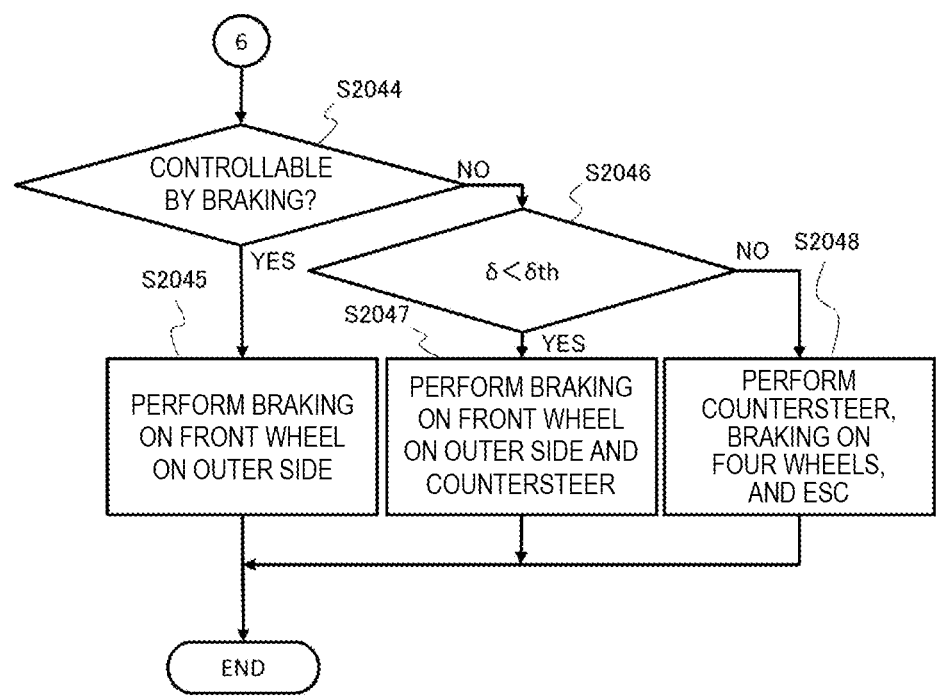
FIG. 14 is a flowchart for illustrating the braking and steering control procedure by the first attitude control unit.

Meanwhile, when the vehicle behavior on the inner side of the target trajectory has an oversteer tendency and the vehicle 100 is traveling at a medium-high speed on a dry road surface having a friction coefficient μ which exceeds the predetermined value, the first attitude control unit 16-8 advances from S2038 to Step S2044 (see FIG. 14).

In Step S2044, the first attitude control unit 16-8 determines whether or not the yaw moment required for suppressing the oversteer tendency at the inner side of the target trajectory can be applied by the distribution of the braking force to the front wheels.

When the required yaw moment can be applied by distribution of the braking force to the front wheels, the first attitude control unit 16-8 advances to Step S2045, and performs braking control of applying the braking force to the front wheels on the turning outer side to suppress the oversteer tendency.

When the vehicle speed is a medium-high speed, in order to avoid inducing unstable behavior due to a delay or error in the restoration of the steering angle δ after countersteer as much as possible, in Step S2045, the first attitude control unit 16-8 does not perform countersteer by controlling to the steering angle δ for turning.

When it is determined in Step S2044 that the required yaw moment cannot be generated by distribution of the braking force to the front wheels, the first attitude control unit 16-8 advances to Step S2046.

In Step S2046, the first attitude control unit 16-8 determines whether or not the actual steering angle δ is smaller than the angle δth obtained by adding the predetermined angle Δθ to the vehicle-body slip angle β.

When the actual steering angle δ is smaller than the angle δth, the first attitude control unit 16-8 advances to Step S2047, and applies a braking force to the front wheels on the turning outer side. When the yaw moment which can be generated by the braking control is not sufficient to suppress the oversteer tendency, the first attitude control unit 16-8 performs countersteer with the angle δth as the limit to suppress the oversteer tendency.

Meanwhile, when the actual steering angle δ is equal to or larger than the angle δth, the first attitude control unit 16-8 advances to Step S2048, performs countersteer with the angle δth as the limit, applies the braking force to the four wheels to decelerate the wheels, and performs hydraulic pressure adjustment of the wheel cylinders 5 to 8 based on the behavior correction moment from the wheel cylinder hydraulic pressure control device 11 (side slip prevention device).

The first attitude control unit 16-8 can, in Step S2048, shift to vehicle z-axis attitude control (braking and drive control) by the second attitude control unit 16-9.

Figure 15:
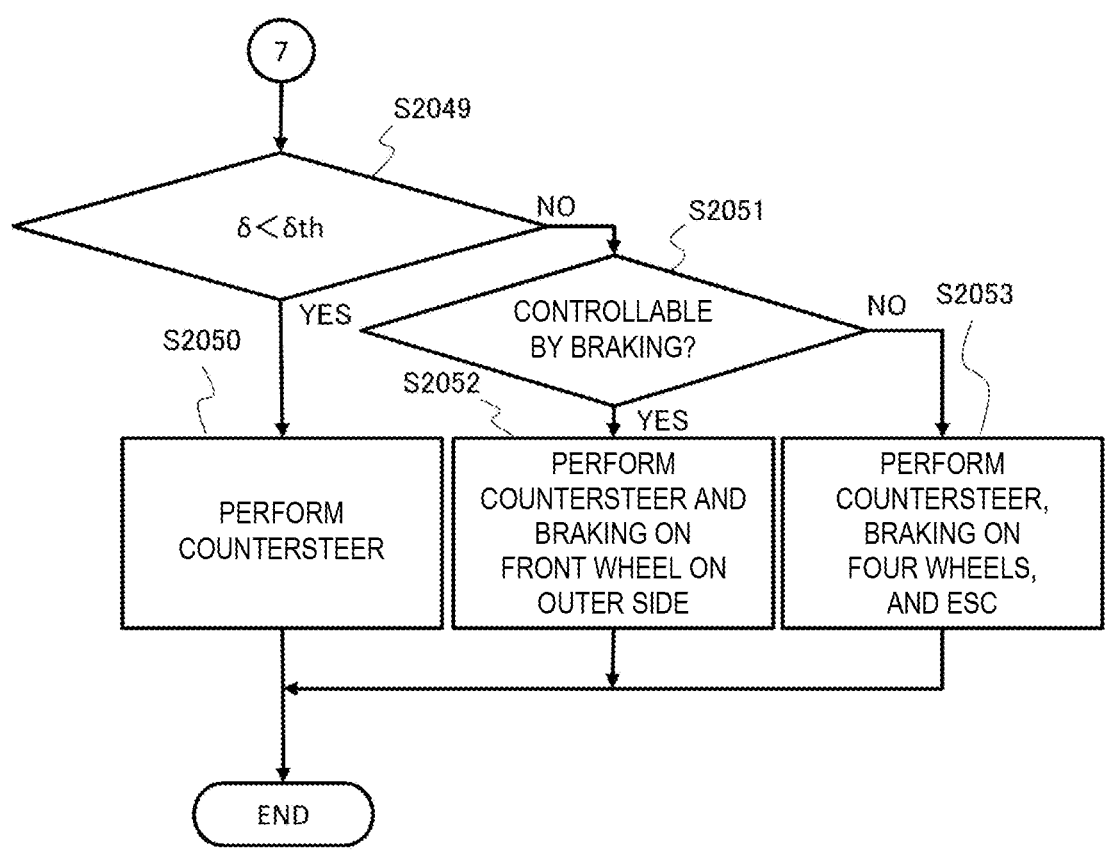
FIG. 15 is a flowchart for illustrating the braking and steering control procedure by the first attitude control unit.

Meanwhile, when the vehicle behavior on the inner side of the target trajectory has an oversteer tendency and the vehicle 100 is traveling at a low speed, the first attitude control unit 16-8 advances from Step S2037 to Step S2049 (see FIG. 15).

In Step S2049, the first attitude control unit 16-8 determines whether or not the actual steering angle δ is smaller than the angle δth obtained by adding the predetermined angle Δθ to the vehicle-body slip angle β.

When the actual steering angle δ is smaller than the angle δth, the first attitude control unit 16-8 advances to Step S2050, performs countersteer with the angle δth as the limit to suppress the oversteer tendency.

Meanwhile, when the actual steering angle δ is equal to or larger than the angle δth, the first attitude control unit 16-8 advances to Step S2051, and determines whether or not the yaw moment required for suppressing the oversteer tendency at the inner side of the target trajectory can be generated by distribution of the braking force to the front wheels.

When the required yaw moment can be generated by distribution of the braking force to the front wheels, the first attitude control unit 16-8 advances to Step S2052, performs countersteer with the angle δth as the limit, and performs braking control of applying the braking force to the front wheels on the turning outer side to suppress the oversteer tendency.

Further, when the required yaw moment cannot be generated by distribution of the braking force to the front wheels, the first attitude control unit 16-8 advances to Step S2053, performs countersteer with the angle δth as the limit, applies a braking force to the four wheels to decelerate the wheels, and performs hydraulic pressure adjustment of the wheel cylinders 5 to 8 based on the behavior correction moment from the wheel cylinder hydraulic pressure control device 11 (side slip prevention device).

The first attitude control unit 16-8 can, in Step S2053, shift to vehicle z-axis attitude control (braking and drive control) by the second attitude control unit 16-9.

The technical concepts described in the above-mentioned embodiment may be used in combination as required, as long as no conflict arises.

Further, although the details of the present invention are specifically described above with reference to the preferred embodiment, it is apparent that persons skilled in the art may adopt various modification aspects based on the basic technical concepts and teachings of the present invention.

For example, the comparison unit 16-6 variably can set the threshold value ΔZP to be compared with the absolute value of the deviation between the target z-axis attitude value ZPOG and the linear model z-axis attitude value ZPLM in accordance with, for example, the friction coefficient of the road surface, the gradient, and the vehicle speed condition. That is, the selection condition for the first attitude control unit 16-8 and the second attitude control unit 16-9 is not limited to the deviation between the target z-axis attitude value ZPOG and the linear model z-axis attitude value ZPLM, and in addition to the deviation, a road surface condition and a traveling condition can be used as the selection condition.

Further, the attitude control unit 16-3 can notify the driver of the vehicle 100 by a warning lamp, for example, that attitude control is being performed by the second attitude control unit 16-9.

Moreover, in the braking and drive control by the second attitude control unit 16-9 illustrated in the flowchart of FIG. 6, any one of braking and drive is mainly controlled in accordance with the conditions, but attitude control can be performed by controlling braking and drive in parallel.

That is, the present invention is not limited to the embodiment described above, and includes further various modification examples. For example, in the embodiment described above, the configurations are described in detail in order to clearly describe the present invention, but the present invention is not necessarily limited to an embodiment that includes all the configurations that have been described. Further, a part of the configuration of a given embodiment can replace the configuration of another embodiment, and the configuration of another embodiment can also be added to the configuration of a given embodiment. Further, another configuration can be added to, deleted from, or replace a part of the configuration of each embodiment.

The present application claims a priority based on Japanese Patent Application No. 2019-042656 filed on Mar. 8, 2019. All disclosed contents including Specification, Scope of Claims, Drawings, and Abstract of Japanese Patent Application No. 2019-042656 filed on Mar. 8, 2019 are incorporated herein by reference in their entirety.

REFERENCE SIGNS LIST 10 braking force generation device, 13 steering device, 14 automatic driving control device, 16 vehicle integrated motion control device, 16-1 FF operation amount calculation unit, 16-2 FB operation amount calculation unit, 16-3 attitude control unit, 16-4 target z-axis attitude calculation unit, 16-5 linear model z-axis attitude calculation unit, 16-6 comparison unit, 16-7 switching unit, 16-8 first attitude control unit, 16-9 second attitude control unit, 100 vehicle

The invention claimed is:

1. A vehicle motion control device, comprising a control unit configured to perform calculations based on information input thereto and to output results of the calculations, wherein the control unit is configured to:
   determine a first control amount being an operation amount required for operation of a vehicle based on a vehicle motion model obtained by modeling a motion state of the vehicle for travel in accordance with a travel target including a target trajectory;
   determine a second control amount being an operation amount of the vehicle based on the first control amount and an actual motion state input from a vehicle motion state detection sensor configured to detect the actual motion state of the vehicle;
   determine a control command of operation amounts relating to braking, drive, and steering of the vehicle based on the second control amount, a physical quantity relating to a target vehicle attitude which is based on the target trajectory, and a physical quantity relating to a linear model vehicle attitude which is based on a linear model of the vehicle; and
   output the control command to actuator units relating to the braking, the drive, and the steering.

2. The vehicle motion control device according to claim 1, wherein the physical quantity relating to the target vehicle attitude and the physical quantity relating to the linear model vehicle attitude are each a physical quantity relating to an attitude of the vehicle in a yaw direction.

3. The vehicle motion control device according to claim 1, wherein the control unit is configured to select the control command from the operation amounts relating to the braking, the drive, and the steering of the vehicle based on a result of comparison between the physical quantity relating to the target vehicle attitude and the physical quantity relating to the linear model vehicle attitude.

4. The vehicle motion control device according to claim 3, wherein the control unit is configured to:
   set, as the control command, the operation amounts relating to the braking and the drive when a difference between the physical quantity relating to the target vehicle attitude and the physical quantity relating to the linear model vehicle attitude exceeds a threshold value; and
   set, as the control command, the operation amounts relating to the braking and the steering when the difference is equal to or smaller than the threshold value.

5. The vehicle motion control device according to claim 4, wherein the control unit is configured to, when the difference exceeds the threshold value:
   set, as the control command, the operation amount relating to the drive when the vehicle is accelerating; and
   set, as the control command, the operation amount relating to the braking when the vehicle is not accelerating.

6. The vehicle motion control device according to claim 4, wherein the control unit is configured to, when the difference exceeds the threshold value and the vehicle is turning outward with respect to the target trajectory:
   set, as the control command, the operation amount relating to the braking when a vehicle-body slip angle is equal to or smaller than a predetermined angle;

set, as the control command, the operation amount relating to the drive when the vehicle-body slip angle exceeds the predetermined angle and the vehicle is accelerating; and set, as the control command, the operation amount relating to the braking when the vehicle-body slip angle exceeds the predetermined angle and the vehicle is not accelerating.

7. The vehicle motion control device according to claim 4, wherein the control unit is configured to, when the difference exceeds the threshold value and the vehicle is turning inward with respect to the target trajectory:

set, as the control command, the operation amount relating to the drive when a vehicle-body slip angle is equal to or smaller than a predetermined angle;

set, as the control command, the operation amount relating to the drive when the vehicle-body slip angle exceeds the predetermined angle and the vehicle is accelerating; and set, as the control command, the operation amount relating to the braking when the vehicle-body slip angle exceeds the predetermined angle and the vehicle is not accelerating.

8. The vehicle motion control device according to claim 1, wherein the control unit is configured to set, as the control command, the operation amount relating to the braking when a physical quantity representing a magnitude of behavior of the vehicle exceeds a predetermined value.

9. A vehicle motion control method comprising:

determining a first control amount being an operation amount required for operation of a vehicle based on a vehicle motion model obtained by modeling a motion state of the vehicle for travel in accordance with a travel target including a target trajectory;

determining a second control amount being an operation amount of the vehicle based on the first control amount and an actual motion state input from a vehicle motion state detection sensor configured to detect the actual motion state of the vehicle;

determining a control command of operation amounts relating to braking, drive, and steering of the vehicle based on the second control amount, a physical quantity relating to a target vehicle attitude which is based on the target trajectory, and a physical quantity relating to a linear model vehicle attitude which is based on a linear model of the vehicle; and outputting the control command to actuator units relating to the braking, the drive, and the steering.

10. The vehicle motion control method according to claim 9, wherein the physical quantity relating to the target vehicle attitude and the physical quantity relating to the linear model vehicle attitude are each a physical quantity relating to an attitude of the vehicle in a yaw direction.

11. The vehicle motion control method according to claim 9, wherein the determining a control command includes selecting the control command from the operation amounts relating to the braking, the drive, and the steering of the vehicle based on a result of comparison between the physical quantity relating to the target vehicle attitude and the physical quantity relating to the linear model vehicle attitude.

12. The vehicle motion control method according to claim 11, wherein the determining a control command includes:

setting, as the control command, the operation amounts relating to the braking and the drive when a difference between the physical quantity relating to the target vehicle attitude and the physical quantity relating to the linear model vehicle attitude exceeds a threshold value; and setting, as the control command, the operation amounts relating to the braking and the steering when the difference is equal to or smaller than the threshold value.

13. A vehicle motion control system, comprising:

a vehicle motion state detection sensor configured to detect an actual motion state of a vehicle;

a control unit configured to:

determine a first control amount being an operation amount required for operation of the vehicle based on a vehicle motion model obtained by modeling a motion state of the vehicle for travel in accordance with a travel target including a target trajectory;

determine a second control amount being an operation amount of the vehicle based on the first control amount and the actual motion state input from the vehicle motion state detection sensor;

determine a control command of operation amounts relating to braking, drive, and steering of the vehicle based on the second control amount, a physical quantity relating to a target vehicle attitude which is based on the target trajectory, and a physical quantity relating to a linear model vehicle attitude which is based on a linear model of the vehicle; and output the control command; and actuator units relating to the braking, the drive, and the steering of the vehicle, which are configured to acquire the control command output from the control unit.

* * * * *